Patented Jan. 31, 1933

1,896,031

UNITED STATES PATENT OFFICE

BLYTHE M. REYNOLDS, OF UTICA, NEW YORK

METHOD OF INCREASING THE ACTIVITY OF OXIDATION CATALYSTS

No Drawing.   Application filed September 11, 1929. Serial No. 391,976.

My invention relates to a method of increasing the activity of oxidation catalysts, and I declare the following to be a full, clear, concise and exact description thereof sufficient to enable anyone skilled in the art to which it appertains to make and use the same.

The object of the invention is to provide a method of increasing the activity of a catalyst, whereby to enhance the efficiency thereof in its initial use or to revivify a catalyst after deterioration from use. The catalyst hereinabove mentioned refers to those used in the production of oxidation products in the vapor phase, especially partial oxidation products of organic compounds.

Although some catalysts produce a more or less satisfactory yield when used for the first time, with continued use they loose their activity or specific ability to cause the desired reaction. The present invention will not only increase the efficiency of the catalyst initially but will revivify catalysts that have become less active from continued use.

It is customary to use as oxidation catalyst, metallic oxides or combinations of oxides, and mixtures or compounds of the same with other materials which may or may not be an active part of the catalyst. Ordinarily at least one metal is present which is capable of forming at least two and usually more oxides. The lower oxides may be converted to the higher under the proper oxidizing conditions and the higher oxides reduced to the lower under reducing conditions.

The conditions of operation to obtain the desired oxidation product with an optimum yield are necessarily strongly oxidizing, in fact, several times the required amount of oxygen is normally used to assure this end. Under these conditions the metals of the catalyst tend to form their highest oxides and as a result become stabilized in that state so that when the highest oxides are not the most effective catalytic oxide of the metal the efficiency of the catalyst is impaired.

It has been discovered by me that the catalyst's activity may be revived by subjecting the oxidizing catalyst of acid character to a reducing atmosphere for a short time. Even many new catalysts before use or during their preparation may be made to have a higher efficiency when used for oxidation purposes by subjecting them to a reducing atmosphere or under conditions which lower the amount of combined oxygen present in said catalyst as hereinafter explained.

In the present method it is not necessary to remove the catalyst from the converter in which it is used but simply to interrupt the oxidizing operation and holding the catalyst at the same temperature at which it is used or a slightly elevated one, to pass reducing gases through it for a short period. The oxidation operation may then be resumed with the improved results.

The reducing gases to be used are dependent on the particular catalyst. In the case of catalyst for partial oxidation of organic hydrocarbons a satisfactory reducing gas consists of a mixture of the particular hydrocarbon used for oxidation with coal gas and only sufficient air to oxidize the hydrocarbon, or the mixture may be one of ammonia gas, the hydrocarbon with its equivalent air and hydrogen. In other cases coal gas and ammonia may be used alone. A mixture of steam, water gas, the hydrocarbon and its equivalent air is satisfactory for some catalysts. The length of time required for revivifying and the frequency of the revivifying process necessarily depends on the catalyst and the conditions under which it is used. In all cases, however, the time thus consumed is but a small percentage of the time the catalyst is used for oxidation purposes.

The following examples will illustrate the application of this invention:

*Example 1.*—A catalyst originally consisting of 80 parts by weight of uranium trioxide and 20 parts of tungsten trioxide coated on granular silica, which has partially lost its activity in producing benzaldehyde from toluol mixed with air at a temperature of 500° C. is revivified in the following manner: the oxidation operation is interrupted and the catalyst heated to 510° C. without disturbing the catalyst. Then a reducing gas is blown through the catalyst mass at a velocity approximately one-tenth of that used during the oxidation reaction. This reducing gas consists of a mixture in percentage by volume as follows: 3% toluol, 15% air 2% ammonia and 80% commercial coal gas. After 20 minutes time of maintaining these conditions in the catalyst zone the revivifying is stopped and the oxidation process resumed with very marked improvement in the efficiency of the catalyst to produce benzaldehyde.

Having thus described my invention what I claim as new and desire to secure by Letters Patent is as follows:

1. The method for restoring the power of a catalyzer, formed by acid metal oxides of various degrees of oxidation, for oxidizing organic substances, the said method consisting in periodically treating the catalyzer in the presence of ammonia with a reducing gas at a temperature from 100–600° C. alternately with the oxidizing reaction proper.

2. The method for restoring the power of a catalyzer, formed by acid metal oxides of various degrees of oxidation, for oxidizing organic substances, the said method consisting in acting on a new catalyzer, in the presence of ammonia with a reducing gas and subsequently periodically treating the catalyzer with a reducing gas at a temperature of from 100–600° C. alternately with the oxidizing reaction proper.

3. The method for restoring the power of a catalyzer, formed by acid metal oxides of various degrees of oxidation, for oxidizing organic substances, the said method consisting in periodically treating the catalyzer in the presence of ammonia with a reducing gas alternately with the oxidizing reaction proper, and maintaining the catalyzer during the action of the reducing gas at a temperature only slightly higher than that of tht oxidizing reaction.

4. The method for restoring the power of a catalyzer, formed by acid metal oxides of various degrees of oxidation, for oxidizing organic substances, the said method consisting in periodically treating the catalyzer in the presence of ammonia with a reducing gas, containing a small content of the organic substance to be oxidized, alternately with the oxidizing reaction proper, and maintaining the catalyzer during the action of the reducing gas at a temperature only slightly higher than that of the oxidizing reaction.

In testimony whereof I have affixed my signature.

BLYTHE M. REYNOLDS.